United States Patent [19]
White et al.

[11] Patent Number: 5,498,195
[45] Date of Patent: Mar. 12, 1996

[54] APPARATUS AND METHOD FOR VERIFYING GEAR ENGAGEMENT IN CONTROLLING THE AUTOMATIC SHIFTING OF A MANUAL-AUTOMATIC TRANSMISSION

[75] Inventors: Gregory R. White, Columbus; Bryan S. Gatewood, Westport; Mark L. Wilson, Columbus, all of Ind.; Peter J. Griffen, Richmond, United Kingdom; Jon A. Steeby, Schoolcraft, Mich.; Dean S. Anderson, Cedar Falls, Iowa; Larry R. Webber, Columbus, Ind.

[73] Assignee: Cummins Electronics Company, Inc., Columbus, Ind.

[21] Appl. No.: 337,545

[22] Filed: Nov. 10, 1994

[51] Int. Cl.$^6$ .................................................. B60K 41/04
[52] U.S. Cl. ........................... 477/110; 477/79; 477/124; 364/424.1
[58] Field of Search .................. 364/424.1; 477/107, 477/110 OR, 77, 79, 80, 121, 124; 74/335

[56] References Cited

U.S. PATENT DOCUMENTS

| | | |
|---|---|---|
| 3,732,755 | 5/1973 | Beig et al. . |
| 4,106,584 | 8/1978 | Matsubara . |
| 4,286,685 | 9/1981 | Rudolph et al. . |
| 4,467,428 | 8/1984 | Caldwell . |
| 4,589,302 | 5/1986 | Oda et al. ........................ 477/107 X |
| 4,598,374 | 7/1986 | Klatt . |
| 4,630,508 | 12/1986 | Klatt . |
| 4,635,508 | 1/1987 | Tatsumi . |
| 4,648,291 | 3/1987 | Klatt et al. . |
| 4,698,762 | 10/1987 | Moriya et al. . |
| 4,702,127 | 10/1987 | Cote . |
| 4,713,764 | 12/1987 | Klatt . |
| 4,722,248 | 2/1988 | Braun . |
| 4,823,646 | 4/1989 | Yoshimura et al. . |
| 4,890,515 | 1/1990 | Taniguchi et al. . |
| 4,892,014 | 1/1990 | Morell et al. . |
| 5,005,687 | 4/1991 | Kurihara et al. ................... 477/80 X |
| 5,043,895 | 8/1991 | Hattori et al. . |
| 5,046,541 | 10/1991 | Shimanaka . |
| 5,047,935 | 9/1991 | Kashihara . |
| 5,047,936 | 9/1991 | Ishii et al. . |
| 5,063,511 | 11/1991 | Mack et al. . |
| 5,079,973 | 1/1992 | Ookubo et al. . |
| 5,089,965 | 2/1992 | Braun . |
| 5,090,269 | 2/1992 | Ohtsuka et al. . |
| 5,107,723 | 4/1992 | Yamashita et al. . |
| 5,117,710 | 6/1992 | Asano et al. . |
| 5,117,711 | 6/1992 | Iizuka . |
| 5,148,721 | 9/1992 | Anan et al. . |
| 5,150,297 | 9/1992 | Daubenmier et al. . |
| 5,157,607 | 10/1992 | Stainton et al. . |
| 5,157,608 | 10/1992 | Sankpal et al. . |
| 5,167,311 | 12/1992 | Satoh et al. . |
| 5,182,969 | 2/1993 | Goto et al. . |
| 5,184,301 | 2/1993 | Stasell . |
| 5,249,484 | 10/1993 | Matsuoka et al. .................... 477/121 |

*Primary Examiner*—Charles A. Marmor
*Assistant Examiner*—Peter Kwon
*Attorney, Agent, or Firm*—Woodard, Emhardt, Naughton, Moriarty & McNett

[57] ABSTRACT

An electronic engine control monitors engine speed, vehicle speed and determines various engine RPM values and RPM ranges used in fueling a motor vehicle engine to achieve desired engine speeds prior to and during an automatic gear shift sequence. The engine is coupled to a manual/automatic transmission that includes manually selectable gear ratio operation modes and automatically selectable gear ratio operation modes. In order to verify engagement of the automatically selectable gear ratio operation modes, a predetermined reverse torque is introduced into the drivetrain by fueling the engine to certain predetermined levels after an automatic gear shift sequence begins and monitoring engine speed to test whether engine speed is within calculated synchronous engine speed ranges corresponding to the gear ratio of the desired automatically selectable gear ratio operation mode.

39 Claims, 8 Drawing Sheets

APPARATUS AND METHOD FOR VERIFYING GEAR ENGAGEMENT IN CONTROLLING THE AUTOMATIC SHIFTING OF A MANUAL-AUTOMATIC TRANSMISSION

FIELD OF THE INVENTION

The present invention relates to electronically controlled transmissions used in conjunction with internal combustion engine powered vehicles, and more specifically to a transmission/engine combination wherein the transmission is a combination manual and automatic transmission.

BACKGROUND OF THE INVENTION

Fully automatic transmission systems, both for heavy duty vehicles such as heavy duty trucks, and for automobiles, that sense throttle openings or position, vehicle speed, engine speed and the like, and automatically shift the vehicle transmission in accordance therewith, are well known in the prior art. Such fully automatic gear change transmission systems include automated transmissions wherein pressurized fluid is utilized to frictionally engage one or more members to other members or to a ground to achieve a selected gear ratio as well as automated mechanical transmissions utilizing electronic and/or pneumatic logic and actuators to engage and disengage mechanical (i.e., positive) clutches to achieve a desired gear ratio. Semi-automatic or manual-automatic transmission systems utilizing electronic control units that sense throttle position, engine speed, input shaft speed, output shaft and/or vehicle speed, and utilize automatically controlled fuel throttle devices, gear shifting devices, and/or master clutch operating devices to substantially automatically implement operator selected transmission ratio changes are known in the prior art.

While such semi-automatic mechanical transmission systems are very well received, as they are somewhat less expensive than a fully automatic transmission systems, allow manual clutch control for low speed operation, and/or do not require automatic selection of the operating gear ratio, they may be too expensive for certain applications as a relatively large number of sensors and automatically controllable actuators, such as a master clutch and/or a fuel throttle device actuator, are required to be provided, installed, and maintained. However, with modern electronic controls for heavy duty truck engines, the majority, if not all, of the sensors are already present for providing feedback relating to engine speed, vehicle speed, throttle position, etc. Thus, an implementation of a semi-automatic transmission or manual-automatic transmission can be achieved with minor modifications to the hardware, particularly those vehicles including an electronic engine controller. Such a system is disclosed in co-pending application Ser. No. 08/108,483. Such systems require relatively sophisticated algorithms to provide reliable operation particularly with respect to the upshift and downshift of the automatically controlled gear ratios of the manual-automatic transmission.

During an electronic automatic shift, it is important to verify gear engagement before returning throttle control to the driver. An electronic shift involves disabling cruise control or engine brake control, disengaging the gear currently engaged and verifying this operation, synchronizing the engine speed to the tailshaft speed for engagement of the requested gear, and verifying the requested gear is engaged before returning throttle control to the driver. The control algorithm that forms a part of the present invention provides a highly reliable mechanism for verifying gear engagement prior to returning throttle control to the driver in the above shift sequence.

SUMMARY OF THE INVENTION

One object of the present invention is to provide a more reliable and improved manual-automatic transmission control system.

Another object of the present invention is to ensure that an automatically controlled transmission gear ratio is properly engaged before returning throttle control to the driver of a vehicle.

Yet another object of the present invention is to prevent undesirable operating conditions from occurring while changing the gear ratio state of a manual-automatic transmission under automated control.

According to one aspect of the present invention, a method for verifying gear engagement after detecting gear disengagement in a vehicle having an engine with a throttle capable of being enabled for driver control and of being inhibited from driver control, and a manual/automatic transmission including manually selectable gears and at least two automatically selectable gears is provided. The method comprising the steps of: (1) calculating a synchronous RPM value corresponding to a desired engine speed at which an ensuing automatic gear shift will take place; (2) inhibiting the throttle from driver control and fueling the engine to achieve an engine speed within a first RPM range of the synchronous RPM; (3) commanding the transmission to engage a desired one of the automatically selectable gears; (4) allowing any engine RPM overshoot from step (2) to settle for a first predetermined time period; (5) fueling the engine to achieve a first predetermined torque output from the engine; (6) calculating an updated synchronous RPM value corresponding to a desired engine speed at which the ensuing automatic gear shift will take place; (7) testing whether the engine speed is within a first predetermined synchronous RPM window; (8) repeating steps (5)–(7) and returning throttle control to the driver if the engine RPM was within the first synchronous RPM window for a second predetermined period of time; (9) performing steps (10)–(12) if throttle control is not returned to the driver after step (8) is completed; (10) fueling the engine to achieve a second predetermined torque output from the engine, based upon the speed-torque fueling characteristics of the engine; (11) calculating an updated synchronous RPM value corresponding to a desired engine speed at which the ensuing automatic gear shift will take place; (12) testing whether the engine speed is within a second predetermined synchronous RPM window; (13) repeating steps (10)–(12) and returning throttle control to the driver if the engine RPM was within the second synchronous RPM window for a third predetermined period of time.

According to another aspect of the present invention, a control device for use with a motor vehicle having an engine with a throttle capable of being enabled for driver control and of being inhibited from driver control, and a manual/automatic transmission including a gear selection input and further having a manual gear selection mode of operation and an automatic gear shift mode of operation including at least two automatically selectable gears is provided. The device comprises means for detecting gear disengagement when the engine is disengaged from the transmission and processor means for controlling selection of automatically selectable gears of the manual/automatic transmission. The processor means is responsive to the means for detecting gear disengagement to inhibit the throttle from driver control and further govern the engine speed to a first predetermined RPM level after gear disengagement is detected. The processor means further provides a gear selection signal to the gear selection input of the transmission to command a desired one of the automatically selectable gears when the engine speed is within a first predetermined RPM range of the first RPM level. The processor means thereafter commands a first predetermined percentage of engine torque and returns throttle control to the driver if the engine speed stays within a second predetermined synchronous RPM window for a second predetermined period of time. The processor means otherwise commands a second predetermined percentage of engine torque and returns throttle control to the driver if the engine speed stays within a third predetermined synchronous RPM engagement window for a third predetermined period of time. In one transmission embodiment, the means for detecting gear disengagement includes means for providing a gear disengagement signal to the processor means and the processor means provides fueling signals to a fueling means to achieve the first predetermined engine torque after providing the gear selection signal. In another transmission embodiment, the processor means includes the means for detecting gear disengagement, with gear disengagement being detected when the engine speed is outside a predetermined RPM disengagement window.

These and other objects of the present invention will become more apparent from the following description of the preferred embodiment.

DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1:
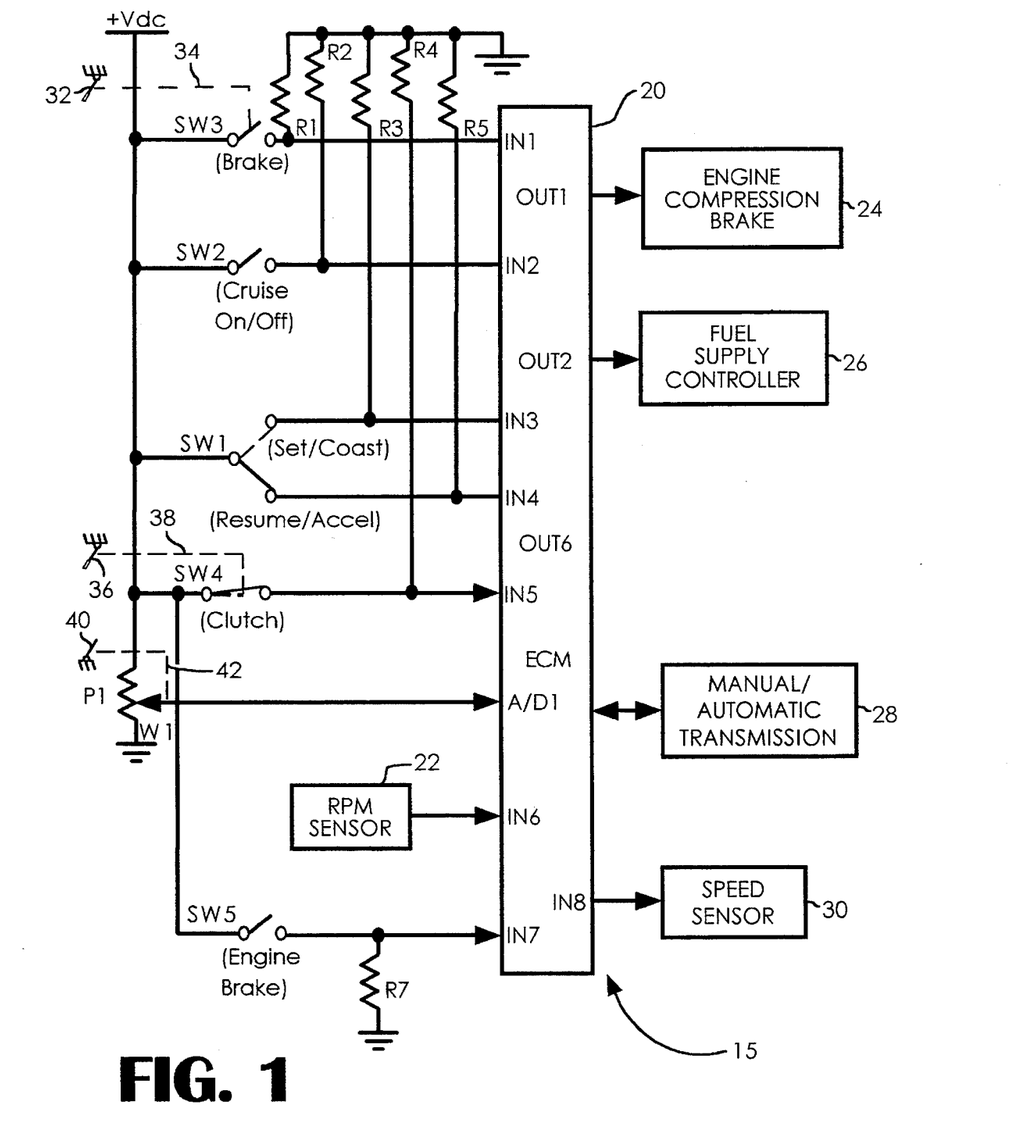
FIG. 1 is a diagrammatic illustration of an electronic controller consistent with the teachings of the present invention.

Referring to FIG. 1, a diagrammatic illustration of a control system 15 according to the present invention is shown. The control system 15 includes as its central component electronic control module (ECM) 20. ECM 20 is a microcomputer including a microprocessor having memory including ROM and RAM and a plurality of inputs and outputs (I/O) in addition to interface circuits for I/O interfacing. The ROM portion of ECM 20 may further include EPROM, EEPROM, Flash PROM and any other reusable type of read-only-memory known to those skilled in the art. The input signals supplied to ECM 20 are produced by various switches and sensors which respond to operating conditions of the engine and vehicle, and inputs from the driver.

Switches SW1 and SW2 are mounted in the driver's cab or driver compartment and provide the driver with a means for turning the cruise control functions on and off, via switch SW2, and for establishing a desired cruise speed via switch SW1, as well as permitting the vehicle to coast without cruise control operation. Switch SW1 also provides input signals to activate resume/acceleration features well known in the art of cruise control systems. Switch SW2 enables cruise control operation while switch SW1 is used to activate the operational modes of the cruise control system built into the software of ECM 20. Switch SW1 is a momentary center-off SPDT switch. The set/coast cruise control function is activated by shorting input IN3 of ECM 20 to logic high voltage, or $+V_{DC}$. This is accomplished by closing switch SW1 and connecting $+V_{DC}$ to the signal path connected to resistor R3 and input IN3. In the alternative, when switch SW1 is actuated to connect input IN4 and resistor R5 with $+V_{DC}$, input IN4 is raised to a logic high and the ECM 20 is informed that the driver is actuating the resume or acceleration features of the cruise control system.

Switch SW5 is a driver-operated switch which provides an input signal to the ECM 20 regarding the operating state (on/off) of the engine compression brake desired by the driver. Switch SW5 is a normally open switch which, when closed, supplies a high logic signal level to input IN7 of ECM 20 indicating engine brake operation is desired. When switch SW5 is open, resistor R7 pulls input IN7 to logic low or ground, thereby providing ECM 20 with a logic low signal corresponding to a driver request to disable or discontinue engine brake operation.

Accelerator pedal 40 is mechanically coupled, via linkage 42 to the wiper W1 of potentiometer P1. The wiper W1 is connected to an analog to digital (A/D) converter input A/D1 of ECM 20. The position of accelerator pedal 40 corresponds directly to the voltage present on wiper W1. Although potentiometer P1 is connected at one terminal to $+V_{DC}$ and at the other terminal to ground, the voltage present on wiper W1 ranges between a window of (ground + deltav1) and ($+V_{DC}$ −deltav2), where deltav1 and deltav2 represent voltage offsets. In this application, when accelerator pedal 40 is in the throttle closed or non-depressed position, the voltage present on wiper W1 is below a predetermined voltage corresponding to a throttle closed position. If the wiper W1 voltage is above a predetermined voltage, it is considered by the ECM 20 to be an indicator that the throttle is open. Throttle control by the operator, including cruise control operation, may be inhibited by the ECM 20 and engine fueling may thereafter be controlled by the ECM 20.

Output OUT1 of ECM 20 supplies a signal to engine compression brake 24 which is a part of the engine of the vehicle (not shown), to provide engine compression braking operation as is well known in the operation of heavy duty trucks.

Output OUT2 of ECM 20 provides continuously variable signals which control the fuel supply controller 26. The continuously variable signals supplied to fuel supply controller 26 enable ECM 20 to fuel the engine of the vehicle to any particular rpm (revolutions per minute) desired. Under normal vehicle operation, the throttle is controlled by the driver via the accelerator pedal 40. In this normal mode of operation, the fuel supply controller 26 is actuated in response to driver demand. However, throttle control by the driver is capable of being inhibited by the ECM 20 so that the ECM 20 may control the fuel supply controller 26 to fuel the engine in certain situations to be more fully discussed hereinafter. Fuel supply controller may take the form of a fuel shut-off valve, fuel injectors or other fueling mechanisms responsive to electronic signals for controlling fuel supply rates to an engine.

Speed sensor 30 and RPM sensor 22 supply signals to ECM 20 indicative of the vehicle speed and engine speed, respectively. RPM sensor 22 supplies a pulse train signal to input IN6 of ECM 20. The pulse train signal supplied to input, IN6 is monitored by ECM 20 to determine engine RPM speed. Similarly, the speed sensor 30, which detects tail shaft or drive shaft rotational speed, provides a similar pulse train signal to input IN8 of ECM 20 wherein the frequency of the pulse train delivered to ECM 20 indicates the speed of rotation of the output shaft of the transmission 28 or the drive shaft of the vehicle drive train.

The manual automatic transmission 28 is connected via various signal path lines to ECM 20. The interface between ECM 20 and manual/automatic transmission (MAT) 28 is more specifically shown for two different transmission embodiments in FIGS. 2 and 3, respectively. The I/O interface between ECM 20 and MAT 52 shown in FIG. 2 includes a gear engagement status logic feedback signal supplied to input IN10 as well as an automatic shift-mode request switch SW6 that supplies a logic signal to input IN11 indicating whether automatic gear shifting operation is desired. Switch SW6 is actuated in response to driver positioning of gearshift lever 50. Gear shift lever 50 is coupled to switch SW6 via actuator linkage 54. Resistor R6 maintains the logic signal present at input IN11 of ECM 20 at a logic high whenever normally open switch SW6 is not closed. When switch SW6 is closed, the logic signal present at input IN11 is at a logic low level. Gear selection logic signals supplied to outputs OUT3 and OUT4 of ECM 20 control the actuation of sixth gear and seventh gear solenoid actuators (not shown) of the MAT 52 to thereby select six and seventh gears respectively. MAT 52 is a Spicer transmission Model No. AS125-7 manufactured by Spicer, a subsidiary of Dana Corporation.

Figure 2:
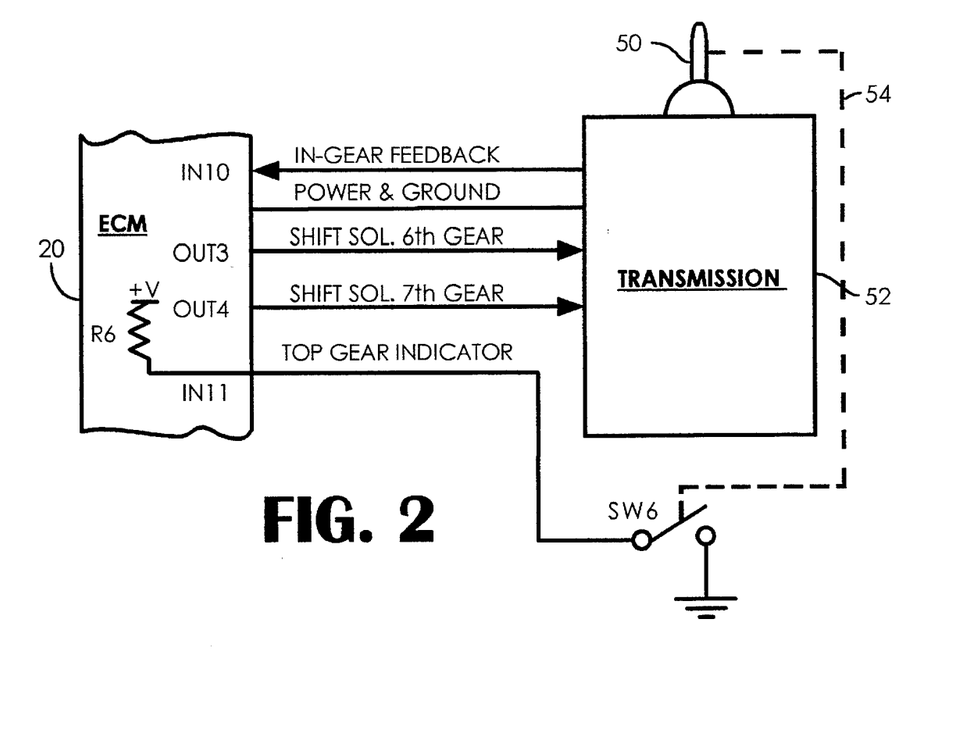
FIG. 2 is a diagrammatic illustration of one embodiment of the engine control module to manual/automatic transmission control interface.

The signal supplied from MAT 52 to input IN10 of ECM 20 is a logic signal indicating that MAT 52 is in a neutral (no gears engaged) operational state when the signal is at a logic low level. When the signal supplied to input IN10 of ECM 20 from MAT 52 is a logic high signal, an "in-gear" state of operation of MAT 52 is indicated. The signal supplied to input IN10 does not indicate which automatically selectable gear ratio operation state is currently engaged. Nevertheless, ECM 20 is aware of the logic output levels at outputs OUT3 and OUT4. Thus, ECM 20 can determine whether MAT 52 was attempted to be placed into sixth gear automatic operation state or seventh gear automatic operation state by the status of outputs OUT3 and OUT4. Whether MAT 52 actually engaged sixth or seventh gear, however, must be determined via the gear confirmation process which is more fully discussed hereinafter. Automatic gear shifting thus occurs in the "top two" gears according to shift algorithms contained within the ECM 20.

Figure 4:
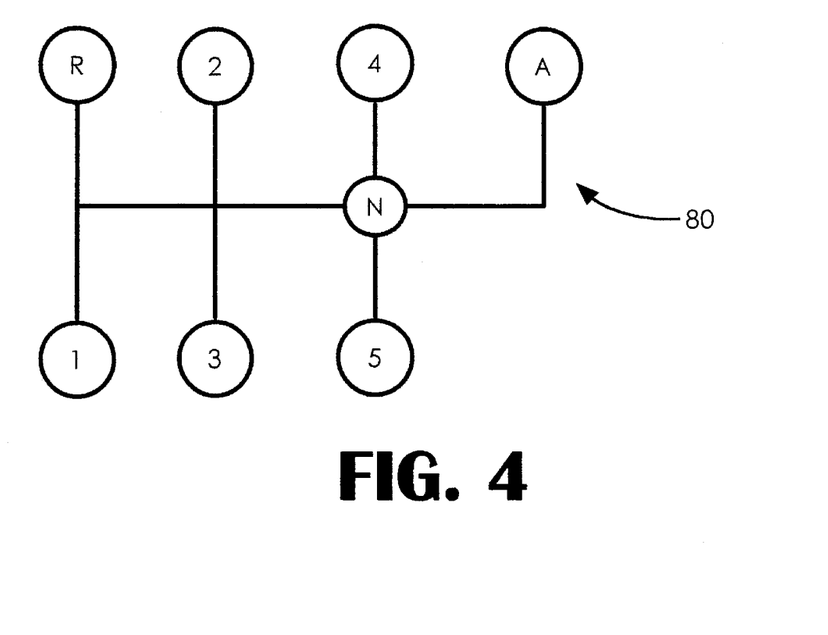
FIG. 4 is a diagrammatic illustration of the shift pattern for a Dana Spicer 7-speed heavy duty truck transmission.

Switch SW6 is actuated only when shift lever 50 is placed into the automatic operation mode position depicted by the shift position A in FIG. 4 wherein automatic actuation of sixth and seventh gear is requested by the driver of the vehicle. The other shift lever positions of FIG. 4 correspond to the reverse, first, second, third, fourth, and fifth gear ratio operation states which are manually selectable or engageable by the driver.

Figure 3:
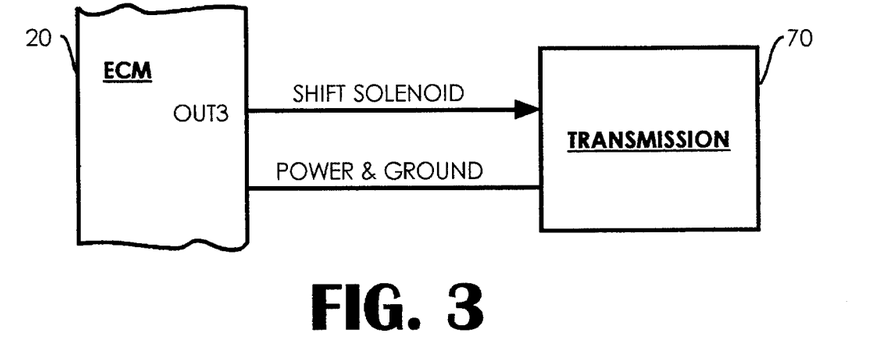
FIG. 3 is another embodiment of the control interface between engine control module and transmission of FIG. 1.
Figure 5:
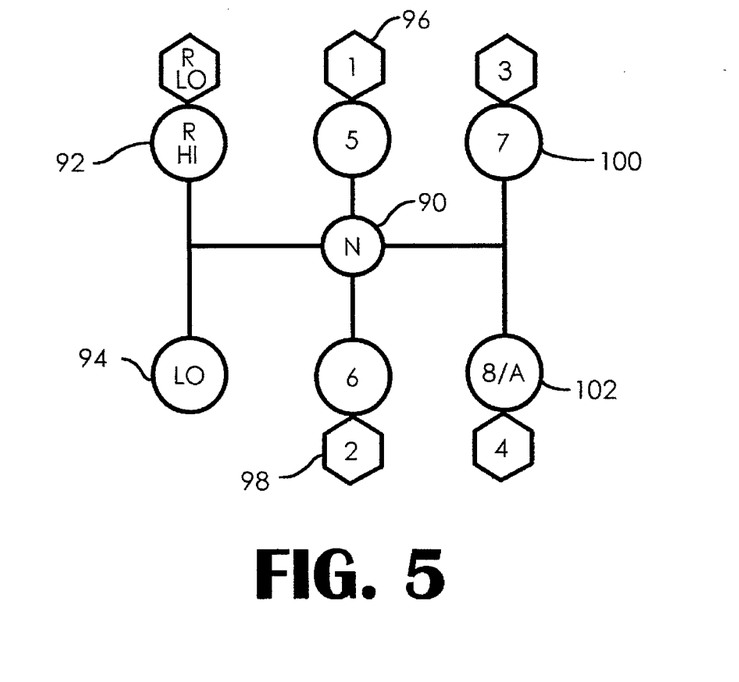
FIG. 5 is a diagrammatic illustration of an Eaton Fuller heavy duty truck transmission shift pattern.

In an alternative transmission embodiment shown in FIG. 3, ECM 20 is electronically connected to and interfaced with MAT 70, an Eaton/Fuller, Inc. transmission model RTT 12609A. The only I/O interface signal required between MAT 70 and ECM 20 is an output signal from output OUT3 supplied to the splitter gear box electro-pneumatic solenoid actuator (not shown) of MAT 70. The splitter gear box of MAT 70 provides an overdrive gear ratio when the MAT 70 is in the highest speed gear operation state. This is further illustrated in FIG. 5 by the gearshift pattern shown which corresponds to the Eaton/Fuller MAT 70. Neutral is found at position 90. Reverse gears are selectable at position 92 and forward gear ratio operational states that are manually selectable are shown at positions 94, 96, 98, 100, and 102. Once the driver has shifted manually through the gears according to the shift order of low, one, two, three, four, five, six, seven, and finally shifted the MAT 70 into the manual gearshift position labeled 8/A, the automatic shifting function of the ECM software is activated to supply a gear request signal at output OUT3 of ECM 20 to shift back and forth between high split and low split to thereby provide an overdrive final drive ratio or higher speed capability gear ratio for MAT 70. Thus, at location 102 the position labeled 8/A is the last manually selected gear position during the manual gear shifting phase of vehicle operation prior to the engagement or selection of automatic shift-mode operation.

The Eaton/Fuller embodiment of the present invention does not require switch SW6 since the auto-shift mode is detected, through software, by comparing engine speed and tailshaft speed. If the ratio of engine speed to tailshaft speed is within a predetermined ratio range, ECM 20 recognizes that the driver has shifted MAT 70 into position 102 in FIG. 5. Thereafter, until the ratio of engine speed to tailshaft speed falls outside the predetermined ratio range, ECM 20 controls the "top two" gears of MAT 70 according to shift algorithms forming a part of the ECM 20 software. Even though the splitter does not have a true neutral state, there is a point where the splitter is neither in low or high split (i.e. disengaged). Disengagement is detected if the engine speed, detected at input IN6 of the ECM 20, is outside of a disengagement window defined as a predetermined delta RPM level above or below the tailshaft speed, detected at input IN8 of the ECM 20. Typically, delta is approximately 150 RPM, but the present invention contemplates delta RPM levels between approximately 5 RPM and 500 RPM. "Neutral" in the MAT 70 application is thus detected by software. Although the interface between MAT 52 and ECM 20 versus the interface between MAT 70 and ECM 20 are substantially different, the operational features are significantly similar when either MAT 52 or 70 is placed into the automatic shift-mode operation state wherein the "top two" final drive gear ratio operation states are automatically selected by the ECM 20. Two electro-pneumatic solenoid valves (not shown) are actuated by logic signals supplied to output OUT3 and output OUT4 of ECM 20 in FIG. 2 to engage sixth gear, seventh gear or neutral operation mode of MAT 52. Pressurized air and air cylinder(s) (not shown) within the MAT 52 or 70 supply the automatic shift mode gear engaging action according to the position of the solenoid valve(s).

One electro-pneumatic solenoid valve is required to operate the splitter of MAT 70 shown in FIG. 3. Thus, the signal supplied to output OUT3 actuates an electro-pneumatic solenoid valve (not shown) which actuates the splitter of MAT 70. The embodiments shown in FIG. 2 and FIG. 3 both include power and ground signals supplied via signal path 58 between the ECM 20 and the MATs 52 and 70.

Figure 6:
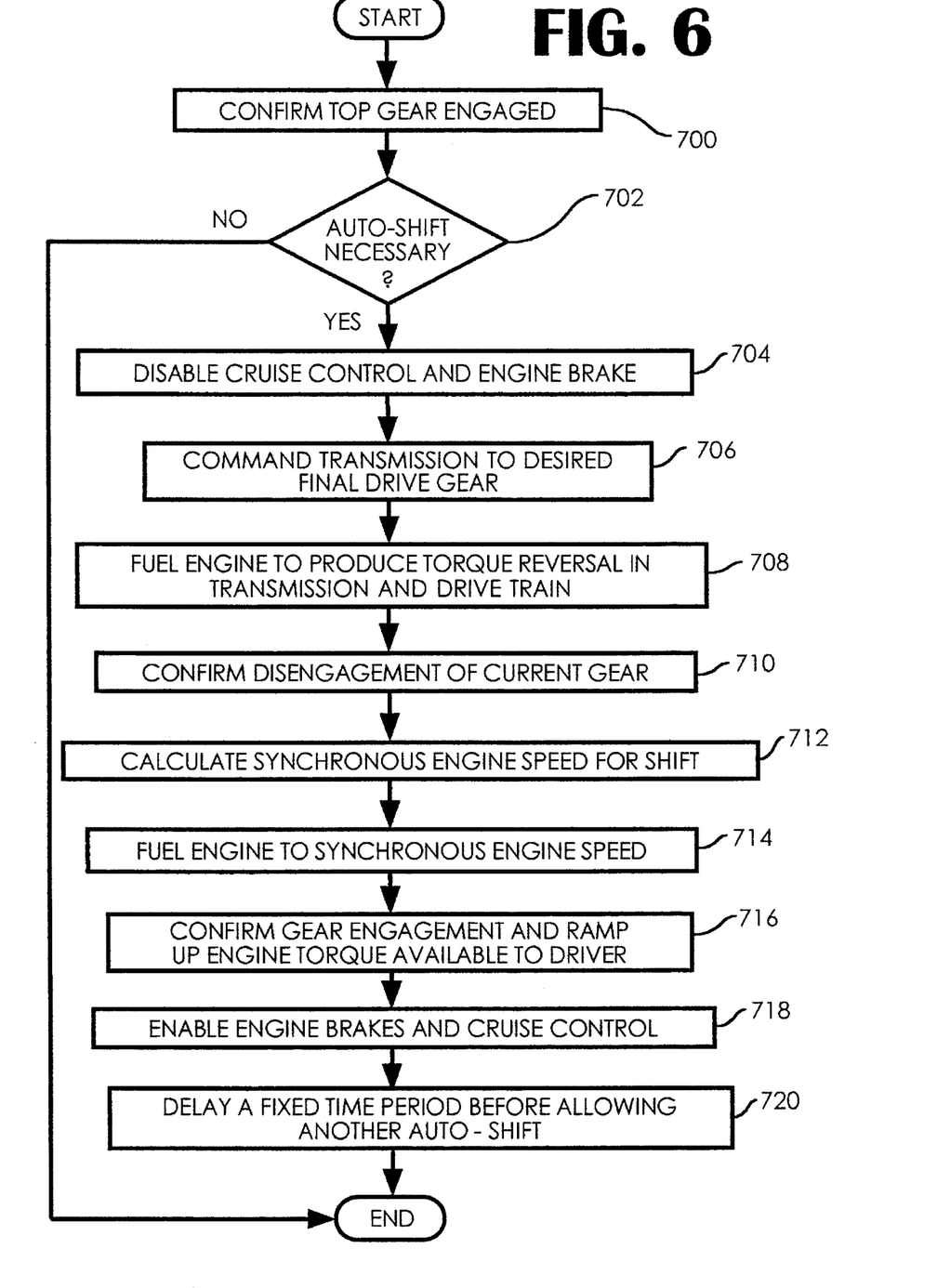
FIG. 6 is a flowchart of an auto-shift sequence according to the print invention.

Operationally speaking, an auto-shift to be performed in the top two gears of the system shown in FIG. 1 and FIG. 2 or FIG. 3 includes the following sequence of events (and is reflected in the flowchart of FIG. 6): (1) confirm that one of the top two gears is engaged, (step 700), (2) determine if an auto-shift is necessary, (step 702), (3) disable cruise control and engine brakes if active, (step 704), (4) command the transmission shift solenoid (or solenoids) to the requested gear, (step 706), (5) fuel the engine to produce a torque reversal in the transmission and drive train, (step 708), (6) confirm disengagement of the current gear, (step 710), (7) calculate synchronous engine speed to engage desired auto-shift gear ratio operation state, (step 712), (8) fuel engine to achieve synchronous engine speed, (step 714), (9) confirm gear engagement, (step 716), (10) ramp the engine torque available to the driver, (step 716), (11) return engine brakes and cruise control to their operational state prior to the auto-shift sequence initiation, (step 718), and (12) delay a fixed period of time before attempting another auto-shift (step 720).

A number of operational factors or conditions are monitored to determine whether to initiate or inhibit an auto-shift sequence. The ECM 20 continuously monitors the system inputs numerous times a second to determine whether or not an auto-shift sequence can be initiated. A preferred repetition time span is approximately 96 milliseconds, although other repetition time intervals are contemplated; that is the ECM 20 should determine whether an auto-shift condition is present and whether an auto-shift should be initiated every 96 milliseconds. An auto-shift is inhibited if any of the following conditions exist: (1) one of the top gears is not confirmed as engaged, which is a condition precedent for an automatic mode upshift or an automatic mode downshift, (2) vehicle speed is below a predetermined level, (3) the clutch pedal is depressed before or during the auto-shift process, (4) a shift delay has not elapsed since the previous auto-shift, and (5) other system faults which indicate to the ECM 20 that an automatic mode shift or auto-shift should not occur, such as speed sensor or RPM sensor failure, or other such hardware failures which prevent proper and safe operation of the auto-shift mode of operation. A manual-automatic transmission and engine control system as depicted in patent application Ser. No. 08/108,483, filed by Gregory R. White, et al., provides a more detailed description of the typical components in a manual-automatic transmission and electronic engine control system, as well as the considerations for determining when and whether to initiate or inhibit an auto-shift sequence, and is hereinafter incorporated by reference.

Figure 7:
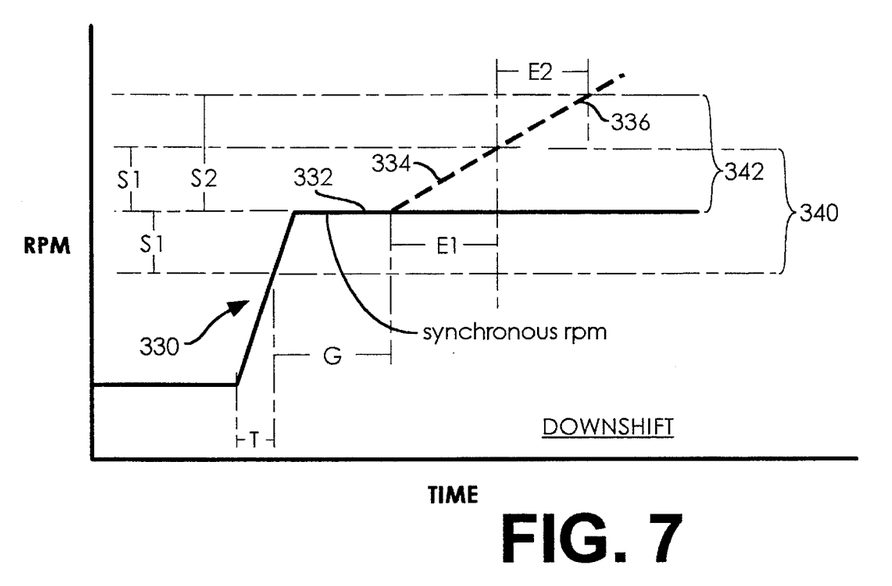
FIG. 7 is a graph of engine RPM versus time for a downshift sequence.
Figure 8:
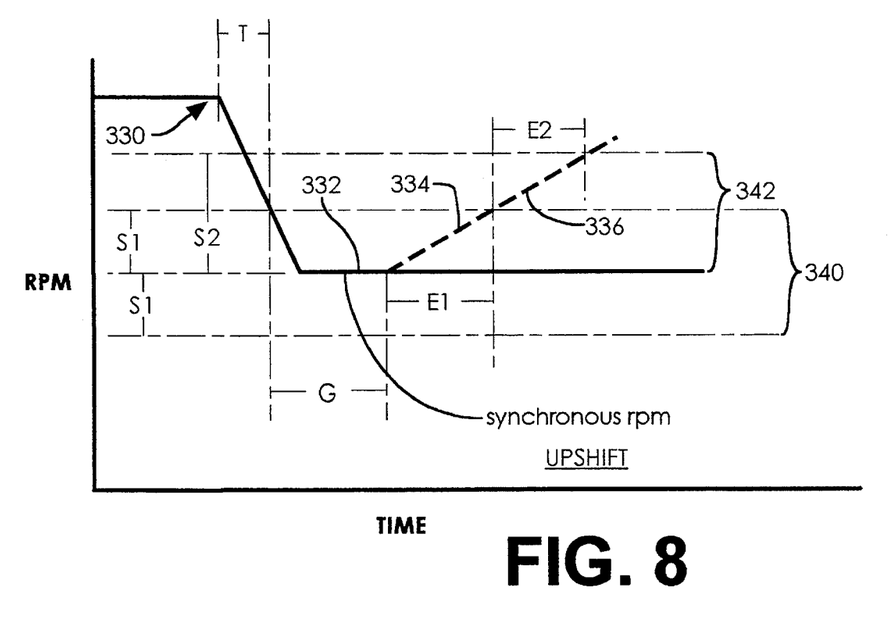
FIG. 8 is a graph of engine RPM versus time for an upshift sequence.

Referring now to FIGS. 7 and 8, a description of the gear engagement confirmation process according to the present invention will now be provided. Curve 330 describes the engine RPM versus time during downshift (FIG. 7) and upshift (FIG. 8) operations. Once the cruise control or engine brake has been disabled by ECM 20, the presently engaged gear is disengaged pursuant to either an automatic upshift or automatic downshift command by ECM 20. When the ECM 20 detects gear disengagement, as previously discussed, the ECM 20 inhibits the throttle from driver control and governs the engine speed to a calculated synchronous RPM represented by the RPM level 332 on RPM curve 330. To achieve synchronous RPM 332, ECM 20 computes the fueling requirements to synchronize the engine speed, sensed at IN6, with the transmission tailshaft speed or drive shaft rotational speed, sensed at IN8, to allow engagement of the desired gear, and commands the fuel supply controller 26 to supply the fuel required to achieve synchronous RPM 332.

Once the engine RPM is within the synchronous RPM window 340 defined by the deviation S1 above and below the synchronous RPM 332, the ECM 20 commands the transmission to engage one of the automatically selectable gears as previously discussed. Thereafter, any engine RPM overshoot is allowed to settle for a period of time designated G, hereinafter referred to as the governor settling time, before gear engagement verification begins. Typically, G is set at approximately 330 milliseconds, but the present invention contemplates governor settling times of between approximately 10 and 1,000 milliseconds.

At the end of the governor settling time G, the method of control of the engine changes from a governed engine speed to torque control and a percentage of engine torque is commanded by ECM 20. Typically engine torque is commanded at a 10 percent level as shown by engine RPM curve 334, but the present invention contemplates engine torque levels anywhere in the range of about 5% to about 100% of the torque output capability of the engine. In any event, the ECM 20 commands the fuel supply controller 26 to supply the fuel required to achieve the desired engine torque.

If the engine RPM curve 330 stays within the synchronous RPM window 340 of ±S1 RPM for the duration of the engagement time E1 then gear engagement is confirmed and throttle control is returned to the driver. Typically, S1 is set at ±100 RPM, but the present invention contemplates S1 settings within the range ±50 RPM to ±1000 RPM. The present invention further contemplates engagement times E1 ranging from between 10 and 1,000 milliseconds, although E1 is typically set at 380 milliseconds.

If the engine RPM curve 330 increases to a level greater than the upper limit S1 of the synchronous RPM window 340 during the time E1, then a new synchronous RPM window 342, defined by S2 as an upper limit and the synchronous RPM 332 as a lower limit, is established as shown in FIGS. 7 and 8. The percentage of torque commanded to the engine may be altered when synchronous RPM window 340 is increased to synchronous RPM window 342. However, the torque level may also remain a constant percentage as shown by engine RPM curve 336 in FIGS. 7 and 8. Although S2 may be set anywhere in the range 50–1000 RPM, it is typically set at approximately 200 RPM. Gear engagement is confirmed, and throttle control returned to the driver, if the engine RPM 330 remains within the new synchronous RPM window 342 for the engagement time E2. If, however, the engine RPM 330 increases to a level greater than the upper limit S2 of the synchronous RPM window 342 during the time E2, gear engagement will not be confirmed and error recovery is performed by ECM 20 by synchronizing the engine RPM to the tailshaft speed or drive shaft rotational speed, reengaging the previous gear and returning throttle control to the driver. Although the engagement time E2 is typically 500 milliseconds, the present invention contemplates E2 times of between approximately 10 and 1,000 milliseconds.

Figure 9:
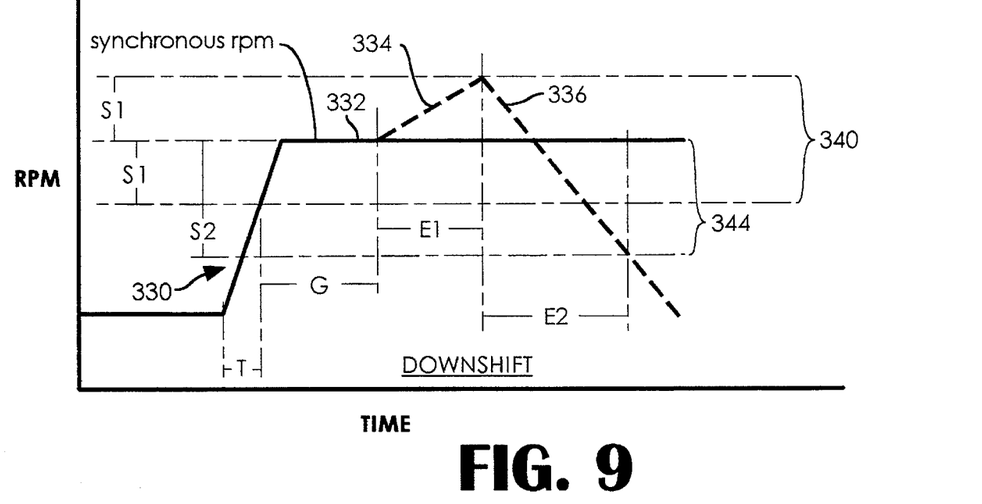
FIG. 9 is a graph of engine RPM versus time for another downshift sequence.
Figure 10:
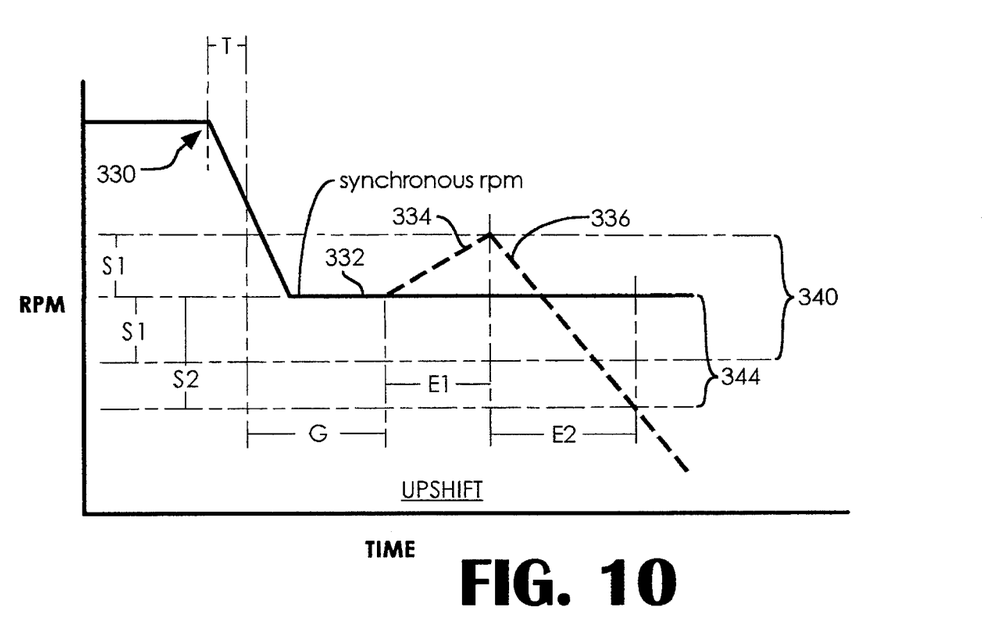
FIG. 10 is a graph of engine RPM versus time for another upshift sequence.

Alternatively, it is possible to reverse the torque in the transmission or drivetrain by changing the torque level 336 commanded during the time E2 to a negative torque value as shown in FIGS. 9 and 10. While the ECM 20 typically commands negative torque at a −100% level, the present invention contemplates negative engine torque levels anywhere in the range of about −5% to about −100% of the torque output capability of the engine. Engagement of the gears will still occur, and throttle control thereafter returned to the driver, if the engine RPM 330 stays within the synchronous RPM window 344, defined by the synchronous RPM 332 as an upper limit and S2 as a lower limit for the engagement time E2. If, however, the engine RPM 330 decreases to a level less than the lower limit S2 of the synchronous RPM window 344 during the time E2, gear engagement will not be confirmed and error recovery is performed by ECM 20 by synchronizing the engine RPM to the tailshaft speed or drive shaft rotational speed, reengaging the previous gear and returning throttle control to the driver. In this alternate arrangement, S2 is typically set at approximately −200 RPM, but the present invention contemplates S2 settings of between −50 RPM and −1000 RPM.

Once gear engagement is confirmed, and throttle control is returned to the driver, cruise control or engine braking is enabled. These functions are disabled during the gear engagement confirmation process to prevent the engine from rapidly accelerating or decelerating if no gear engagement is confirmed. Normally, however, driveline surge will be small enough to allow the engine RPM to stay within the first synchronous RPM window 340 so that confirmation will occur within the engagement time E1. On the few shifts that do have excessive driveline surge, gear engagement can still normally be confirmed within the engagement time E2. If gear engagement cannot be confirmed within the engagement time E2, then error recovery is performed as previously discussed which prevents the driver from having to manually attempt to engage the transmission after a failed shift.

Figure 11A:
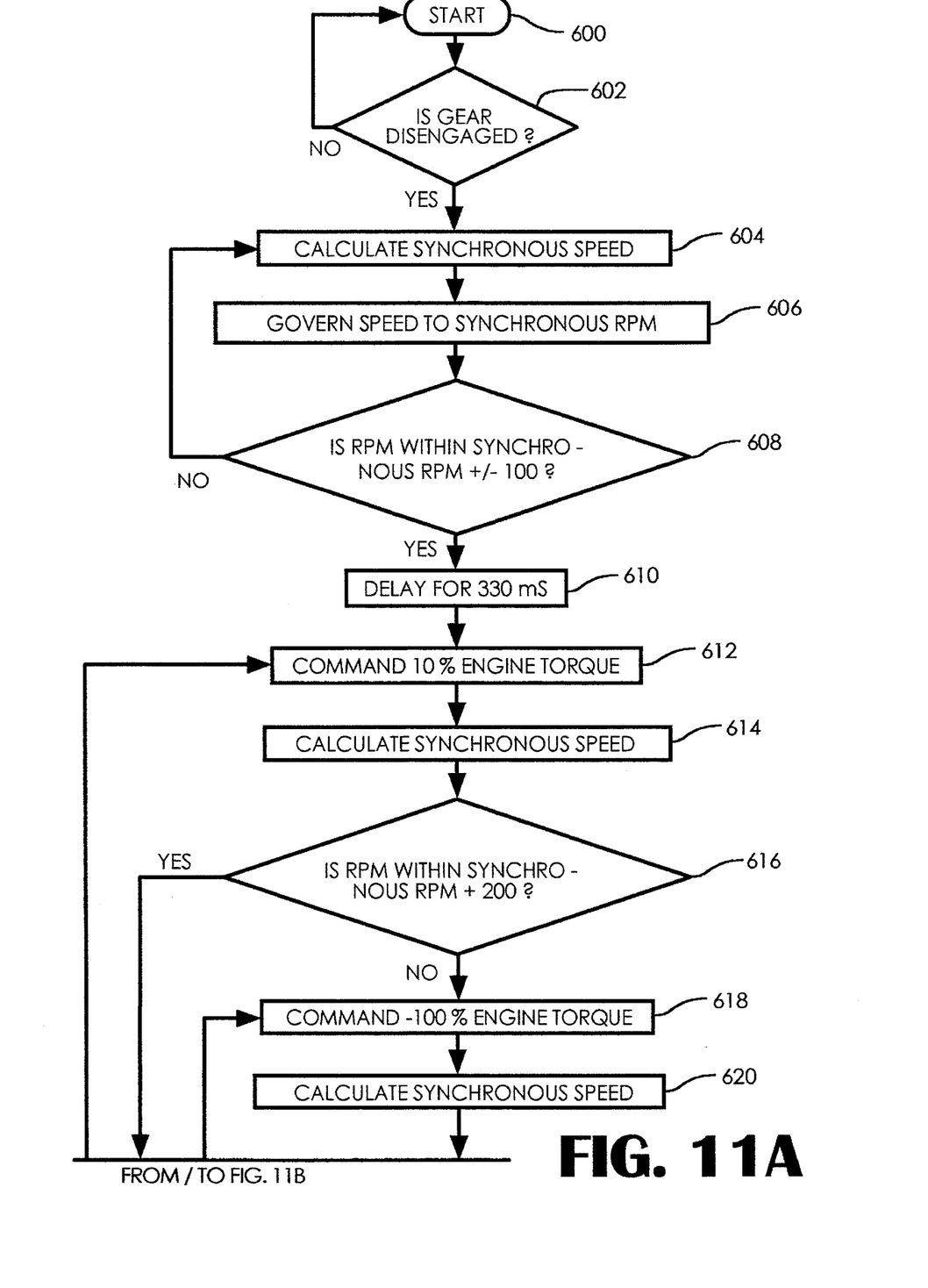
FIG. 11A and 11B describe a flowchart of the algorithm for confirming gear engagement during an automatic shift of a manual-automatic transmission according to the present invention.
Figure 11B:
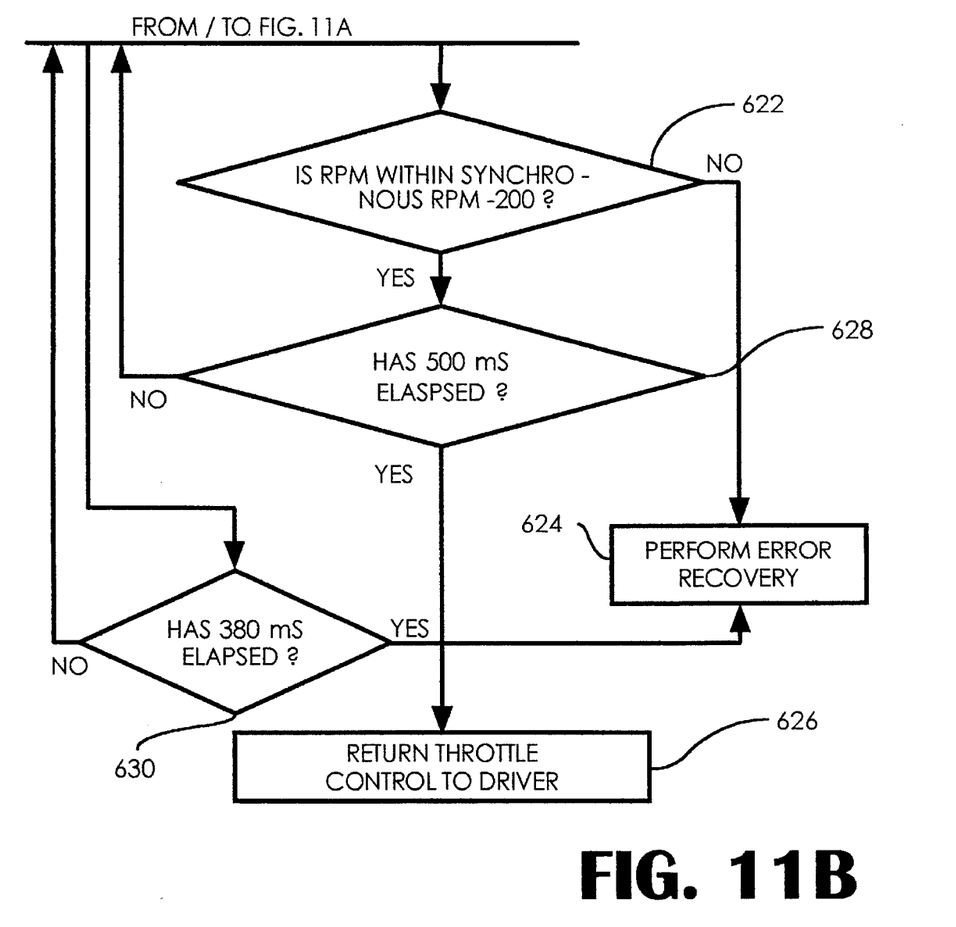

Referring now to FIGS. 11a and 11b, a flowchart for a preferred gear engagement verification algorithm according to the present invention is shown. All numerical values described in relation to this flowchart represent typical values and other values are contemplated by this invention as elsewhere noted. The algorithm begins at step 600 and at step 602, if a gear of the manual-automatic transmission is engaged, then program execution will loop from step 600 to step 602 and back to step 600 continuously until a gear of the manual-automatic transmission becomes disengaged. If a gear is disengaged and detected as such at step 602, then program execution continues at step 604 wherein the computer calculates the synchronous RPM speed for the engine. At step 606, the ECM 20 controls the fuel supplied to the engine via the fuel supply controller 26 in order to achieve the synchronous RPM speed calculated in step 604. At step 608, if the engine RPM is not within the window defined by the synchronous RPM ±100 RPM, then program execution returns to step 604, the synchronous RPM speed is again calculated and step 606 is next executed. Subsequently, step 608 is again executed and the RPM of the engine is tested against the synchronous RPM window. Once engine RPM is within the synchronous RPM window, then program execution continues after step 608 with step 610 and the ECM 20 executes a predetermined delay. Although this predetermined delay may range from 10 milliseconds to 1.0 second, a delay of approximately 330 milliseconds is typical as shown at step 610. Thereafter, at step 612 the computer 24 commands the engine to 10 percent torque level. The 10 percent torque is achieved via a predetermined fueling rate executed by ECM 20.

Thereafter, at step 614 the synchronous engine RPM is again calculated. Following step 614, at step 616 the engine RPM is tested to determine whether the engine RPM is within the window defined by the synchronous RPM level +200 RPM. If the engine RPM at step 616 is not within the range defined by the synchronous RPM +200, then program execution continues at step 618 and the engine is commanded to −100 percent engine torque. Thereafter, at step 620, the ECM 20 calculates the synchronous engine RPM speed again. Next, at step 622, computer 24 tests whether the engine RPM is within the window defined by the synchronous RPM −200 RPM. If the engine RPM is not within the range defined by the synchronous RPM −200 at step 622, then step 624 is executed and error recovery is performed by the ECM 20 in order to prevent undesired operation of the engine and manual-automatic transmission system. Thereafter, throttle control is returned to the driver at step 626.

Returning now to step 622, if the engine RPM is determined to be within the window or synchronous RPM range, then step 628 is next executed and if a predetermined delay has elapsed, then throttle control is returned to the driver at step 626. Although this predetermined delay may range from 10 milliseconds to 1.0 second, a delay of approximately 500 milliseconds is typical as shown at step 628. If at step 628, 500 milliseconds has not elapsed, then program flow returns to step 618 and continues therefrom. Returning now to step 616, if the engine RPM is within the range defined by the synchronous RPM +200 RPM at step 616, then program execution continues with step 630. At step 630, the ECM 20 tests whether a predetermined time period has elapsed. Typically, this predetermined time period is approximately 380 milliseconds as shown at step 630, but the present invention contemplates predetermined time periods of between 10 milliseconds and 1.0 second. If 380 milliseconds has elapsed at step 630, then program flow continues at step 626 and throttle control is returned to the driver. If at step 630 the 380 millisecond time period has not yet elapsed, then program flow returns to step 612.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A method for verifying gear engagement after detecting gear disengagement in a vehicle having an engine with a throttle capable of being enabled for driver control and of being inhibited from driver control, and a manual/automatic transmission including manually selectable gears and at least two automatically selectable gears, the method comprising the steps of:

(1) calculating a synchronous RPM value corresponding to a desired engine speed at which an ensuing automatic gear shift will take place;

(2) inhibiting the throttle from driver control and fueling the engine to achieve an engine speed within a first RPM range of said synchronous RPM;

(3) commanding the transmission to engage a desired one of the automatically selectable gears;

(4) allowing any engine RPM overshoot from step (2) to settle for a first predetermined time period;

(5) fueling the engine to achieve a first predetermined torque output from the engine;

(6) calculating an updated synchronous RPM value corresponding to a desired engine speed at which the ensuing automatic gear shift will take place;

(7) testing whether the engine speed is within a first predetermined synchronous RPM window;

(8) repeating steps (5)–(7) and returning throttle control to the driver if the engine RPM was within said first synchronous RPM window for a second predetermined period of time;

(9) performing steps (10)–(12) if throttle control is not returned to the driver after step (8) is completed;

(10) fueling the engine to achieve a second predetermined torque output from the engine, based upon the speed-torque fueling characteristics of the engine;

(11) calculating an updated synchronous RPM value corresponding to a desired engine speed at which the ensuing automatic gear shift will take place;

(12) testing whether the engine speed is within a second predetermined synchronous RPM window;

(13) repeating steps (10)–(12) and returning throttle control to the driver if the engine RPM was within said second synchronous RPM window for a third predetermined period of time.

2. The method of claim 1 further performing the following step after step (12) is completed:

performing error recovery and returning throttle control to the driver if the engine speed falls outside said second synchronous RPM window.

3. The method of claim 2 wherein said first predetermined torque output is within the range of about 5% to 100% of the torque output capability of the engine.

4. The method of claim 3 wherein said second predetermined torque output is within the range of about 5% to 100% of the torque output capability of the engine.

5. The method of claim 4 wherein step (1) further includes the steps of:

(a) detecting tailshaft speed, and (b) calculating said synchronous RPM value corresponding to an engine speed which is synchronized with said tailshaft speed to thereby permit said ensuing automatic gear shift to take place.

6. The method of claim 5 wherein step (2) further includes the steps of:

(a) detecting engine speed, and (b) varying fuel delivery rates to the engine until the engine is operating at a speed within said first predetermined RPM range.

7. The method of claim 6 wherein said first predetermined time period is within the range of approximately 10 milliseconds to 1.0 second.

8. The method of claim 7 wherein said second predetermined time period is within the range of approximately 10 milliseconds and 1.0 seconds.

9. The method of claim 8 wherein said third predetermined time period is within the range of approximately 10 milliseconds and 1.0 seconds.

10. The method of claim 9 wherein said first predetermined RPM range is defined as said synchronous RPM level plus delta1 RPM and said desired synchronous RPM level minus delta1 RPM.

11. The method of claim 10 wherein said delta1 RPM is within the range of approximately 50 RPM to 1000 RPM.

12. The method of claim 11 wherein said first predetermined synchronous RPM window is defined as said synchronous RPM level plus delta2 RPM and said desired synchronous RPM level minus delta2 RPM.

13. The method of claim 12 wherein said delta2 RPM is within the range of approximately 50 RPM to 1000 RPM.

14. The method of claim 13 wherein said second predetermined synchronous RPM window is defined as said synchronous RPM level and said synchronous RPM level plus delta3 RPM.

15. The method of claim 14 wherein said delta3 RPM is within the range of approximately 50 RPM to 1000 RPM.

16. The method of claim 13 wherein said second predetermined torque output is a negative engine output torque.

17. The method of claim 16 wherein said second predetermined synchronous RPM window is defined as said synchronous RPM level minus delta4 RPM and said synchronous RPM level.

18. The method of claim 17 wherein said delta4 RPM is within the range of approximately 50 RPM to 1000 RPM.

19. A control device for use with a motor vehicle having an engine with a throttle capable of being enabled for driver control and of being inhibited from driver control, and a manual/automatic transmission including a gear selection input and further having a manual gear selection mode of operation and an automatic gear shift mode of operation including at least two automatically selectable gears, said device comprising:

means for detecting gear disengagement when the engine is disengaged from the transmission;

processor means for controlling selection of automatically selectable gears of the manual/automatic transmission, said processor means being responsive to said means for detecting gear disengagement to inhibit the throttle from driver control and further govern the engine speed to a first predetermined RPM level after said gear disengagement is detected, said processor means providing a gear selection signal to the gear selection input of the transmission to command a desired one of the automatically selectable gears when the engine speed is within a first predetermined RPM range of said first RPM level, said processor means thereafter commanding a first predetermined percentage of engine torque and returning said throttle control to the driver if said engine speed stays within a second predetermined synchronous RPM window for a second predetermined period of time, said processor means otherwise commanding a second predetermined percentage of engine torque and returning said throttle control to the driver if said engine speed stays within a third predetermined synchronous RPM engagement window for a third predetermined period of time.

20. The device of claim 19, further comprising:

means for detecting engine speed and producing an engine speed signal corresponding to said engine speed; and means for detecting tailshaft speed and providing a tailshaft speed signal corresponding to said tailshaft speed;

wherein said first predetermined RPM level corresponds to a synchronous RPM level, said synchronous RPM level being defined as the RPM level the engine must reach to synchronize with the transmission tailshaft RPM to thereby allow engagement of said one of the automatically selectable gears.

21. The device of claim 20, further comprising:
fueling means for providing fuel to the engine in accordance with signals supplied to said fueling means;
wherein said processor means includes a first input for receiving said tailshaft speed signal, a second input for receiving said engine speed signal, and a first output for providing fueling signals to said fueling means, and
further wherein said processor means governs said engine speed to said synchronous RPM level by providing said fueling signals to said fueling means to achieve said synchronous RPM level.

22. The device of claim 21 wherein said means for detecting gear disengagement includes means for providing a gear disengagement signal to said processor means, said processor means providing said fueling signals to said fueling means to achieve said first predetermined engine torque after providing said gear selection signal.

23. The device of claim 21 wherein said processor means includes said means for detecting gear disengagement, said gear disengagement being detected when said engine speed is outside a predetermined RPM disengagement window.

24. The device of claim 23 wherein said predetermined RPM disengagement window is defined as said tailshaft speed plus delta RPM and said tailshaft speed minus delta RPM.

25. The device of claim 24 wherein said delta RPM is within the range of approximately 5 RPM and 500 RPM.

26. The device of claim 21 wherein said first predetermined time period is within the range of approximately 10 milliseconds to 1.0 second.

27. The device of claim 26 wherein said second predetermined time period is within the range of approximately 10 milliseconds and 1.0 seconds.

28. The device of claim 27 wherein said third predetermined time period is within the range of approximately 10 milliseconds and 1.0 seconds.

29. The device of claim 28 wherein said first predetermined RPM range is defined as said synchronous RPM level plus delta1 RPM and said desired synchronous RPM level minus delta1 RPM.

30. The device of claim 29 wherein said delta1 RPM is within the range of approximately 50 RPM to 1000 RPM.

31. The device of claim 30 wherein said first predetermined synchronous RPM window is defined as said synchronous RPM level plus delta2 RPM and said desired synchronous RPM level minus delta2 RPM.

32. The device of claim 31 wherein said delta2 RPM is within the range of approximately 50 RPM to 1000 RPM.

33. The device of claim 32 wherein said second predetermined synchronous RPM window is defined as said synchronous RPM level and said synchronous RPM level plus delta3 RPM.

34. The device of claim 33 wherein said delta3 RPM is within the range of approximately 50 RPM to 1000 RPM.

35. The device of claim 34 wherein said second predetermined torque output is a negative engine output torque.

36. The device of claim 35 wherein said second predetermined synchronous RPM window is defined as said synchronous RPM level minus delta4 RPM and said synchronous RPM level.

37. The device of claim 36 wherein said delta4 RPM is within the range of approximately 50 RPM to 1000 RPM.

38. The device of claim 19 wherein said processor means is a microcomputer including:
a memory, said memory including ROM and RAM;
a plurality of inputs and outputs; and
a plurality of interface circuits for interfacing with said plurality of inputs and outputs.

39. The device of claim 38 wherein said ROM includes at least one of EPROM, EEPROM and Flash PROM.

* * * * *

UNITED STATES PATENT AND TRADEMARK OFFICE
CERTIFICATE OF CORRECTION

PATENT NO. : 5,498,195
DATED : March 12, 1996
INVENTOR(S) : Gregory R. White, et al.

It is certified that error appears in the above-identified patent and that said Letters Patent is hereby corrected as shown below:

Delete Drawing Sheet 8, and substitute therefor the Drawing Sheet consisting of FIG.11B, as shown on the attached page.

Signed and Sealed this

Twenty-sixth Day of November 1996

Attest:

BRUCE LEHMAN

*Attesting Officer*        *Commissioner of Patents and Trademarks*

FIG. 11B